United States Patent Office 2,711,220
Patented June 21, 1955

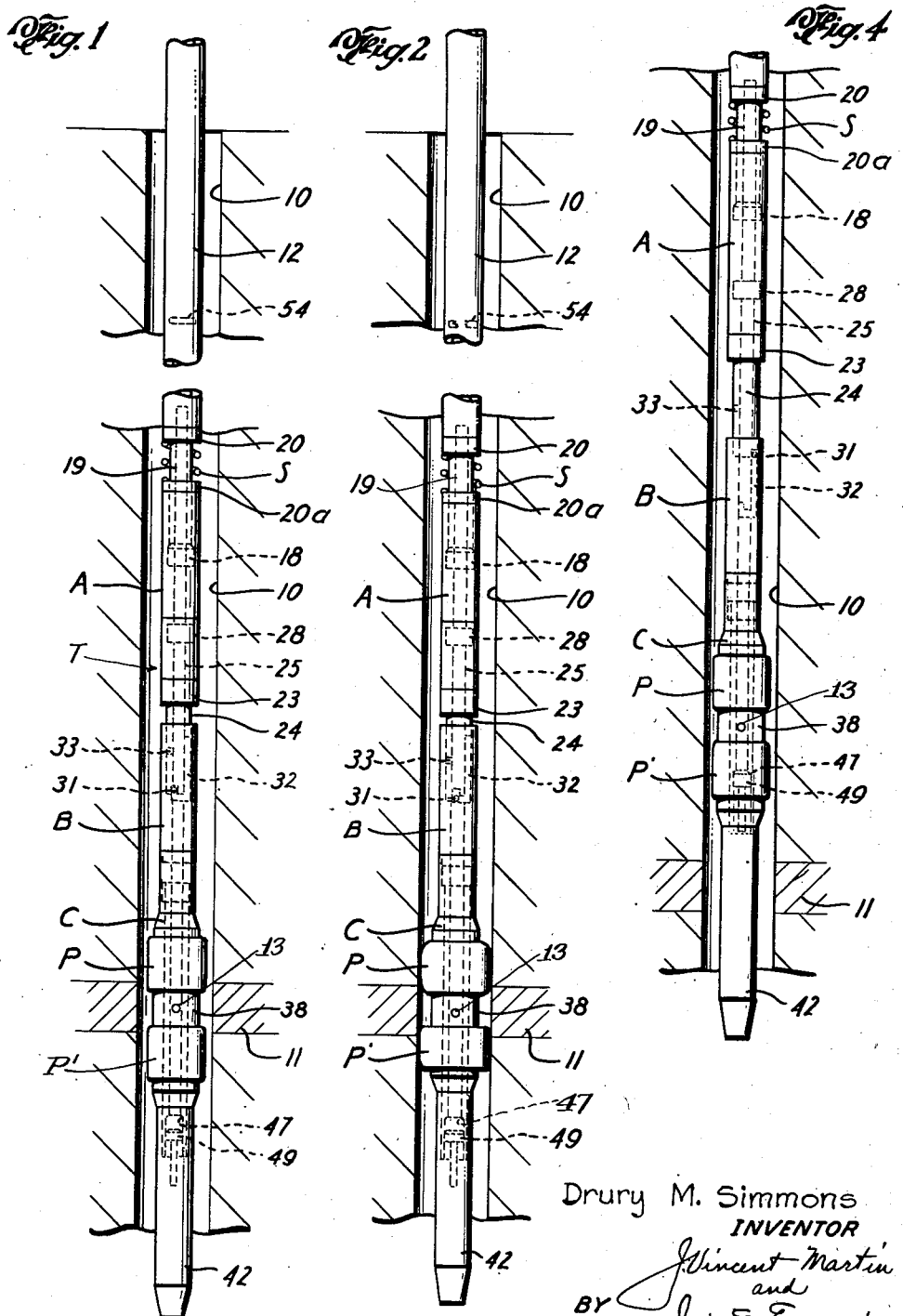
June 21, 1955  D. M. SIMMONS  2,711,220
FORMATION TESTING APPARATUS
Filed June 6, 1949  6 Sheets-Sheet 1
Drury M. Simmons
INVENTOR
BY J. Vincent Martin
and
Joe E. Edwards
ATTORNEYS June 21, 1955  D. M. SIMMONS  2,711,220
FORMATION TESTING APPARATUS
Filed June 6, 1949  6 Sheets-Sheet 2
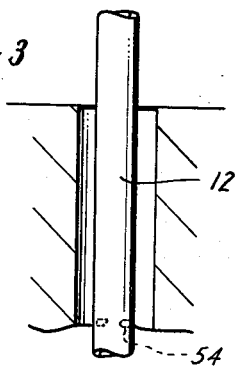
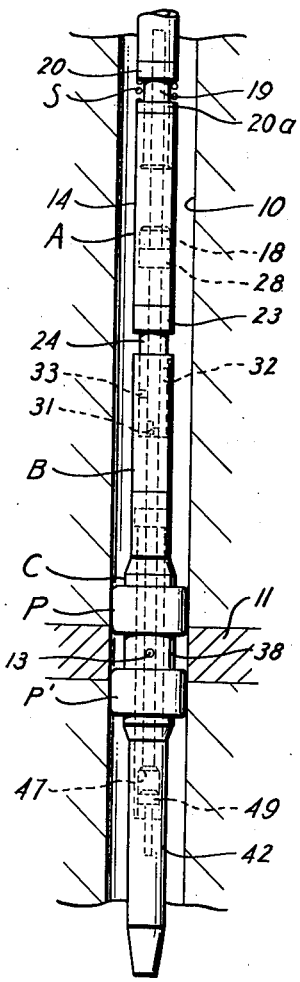
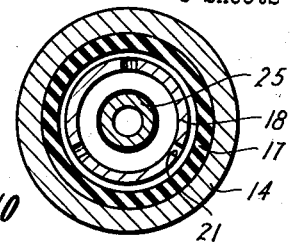
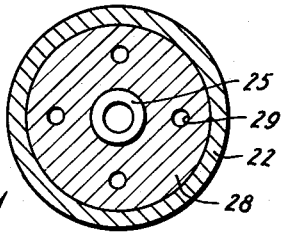
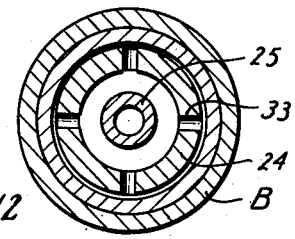
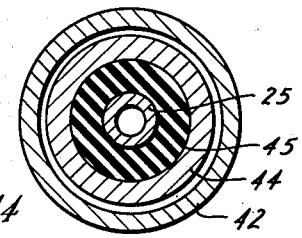
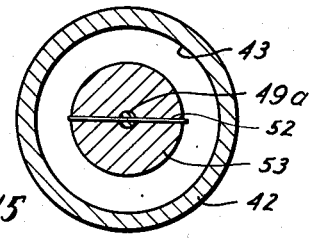
Drury M. Simmons
INVENTOR
BY Vincent Martin
and
Joe E. Edwards
ATTORNEYS

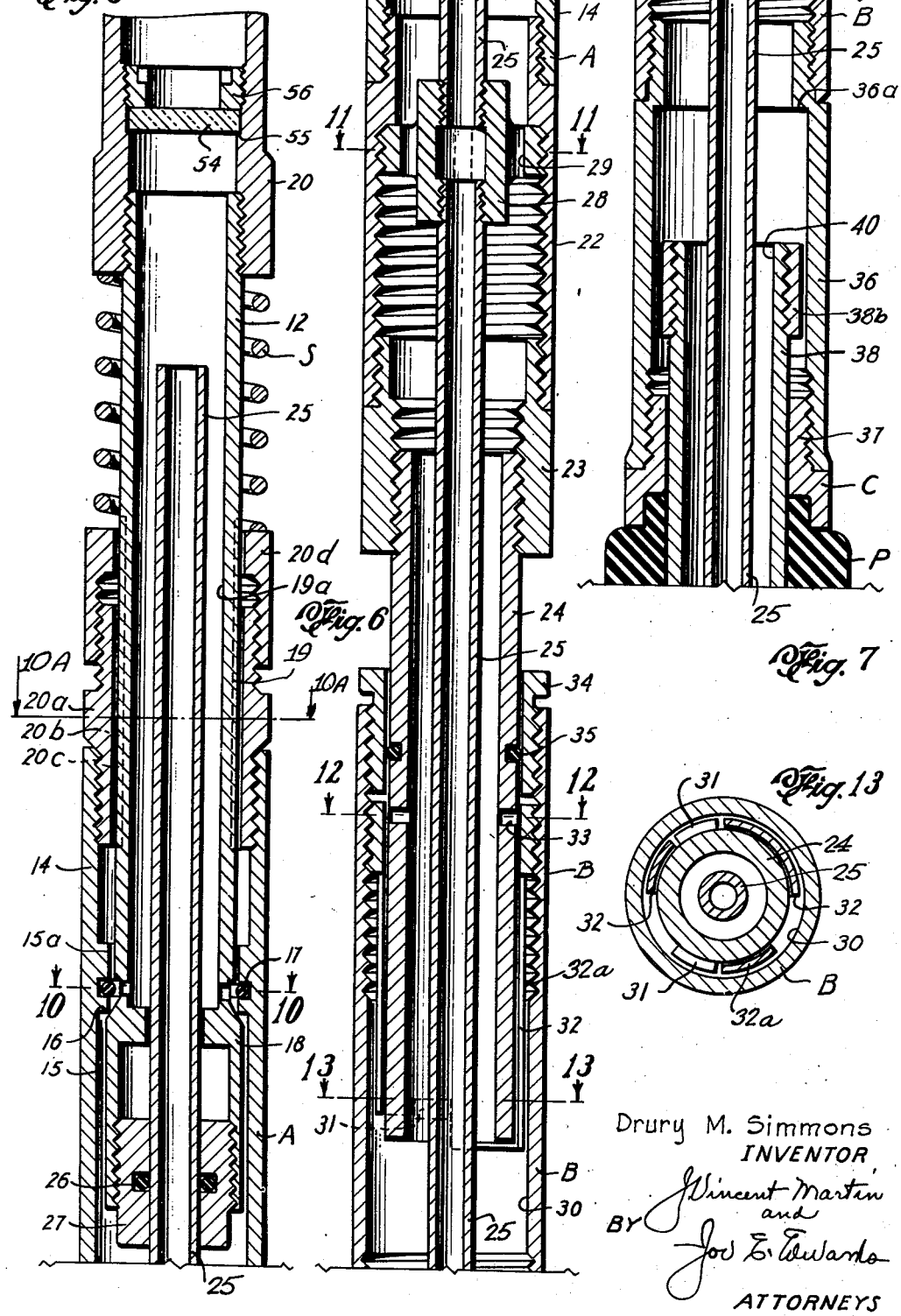

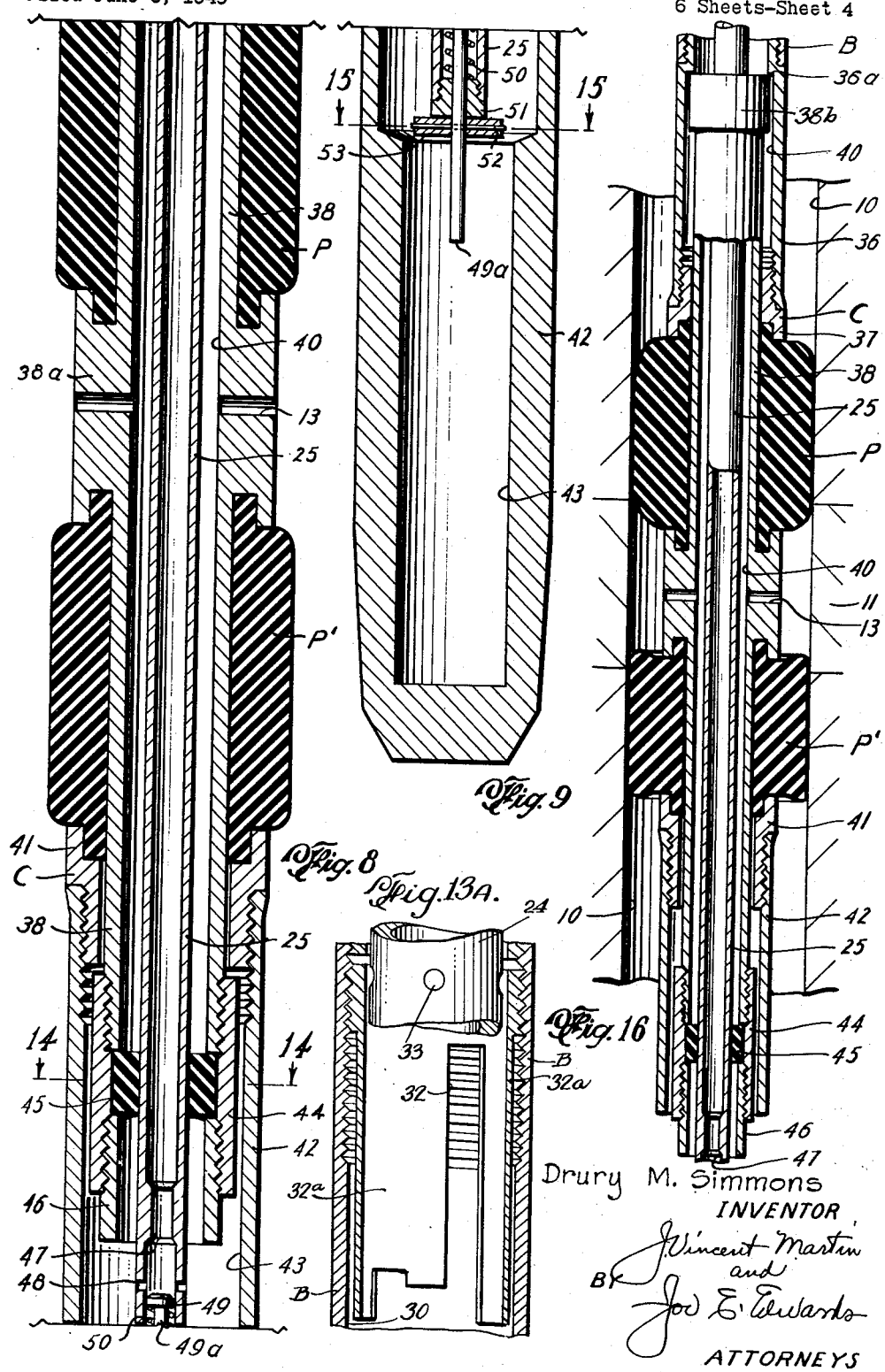

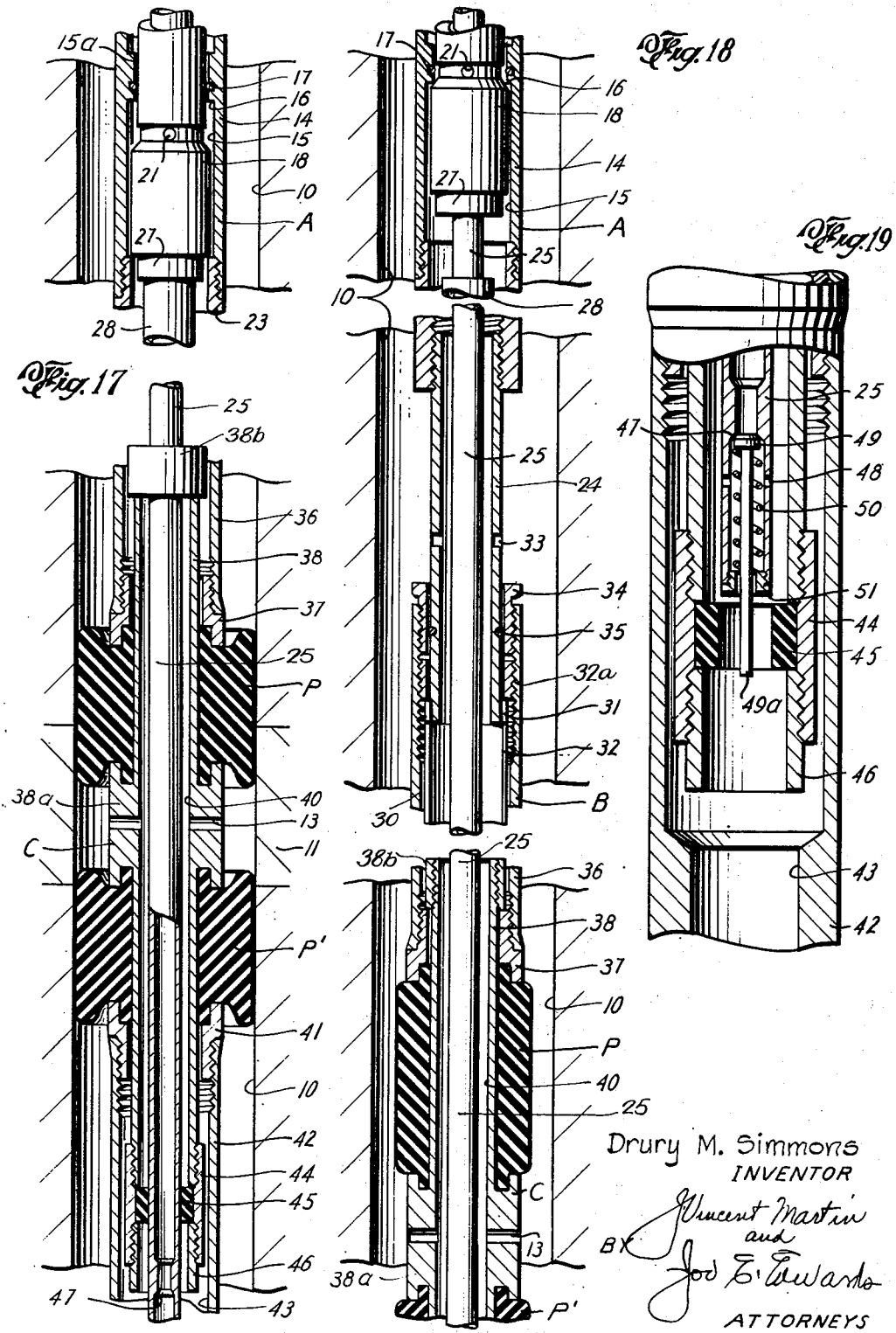

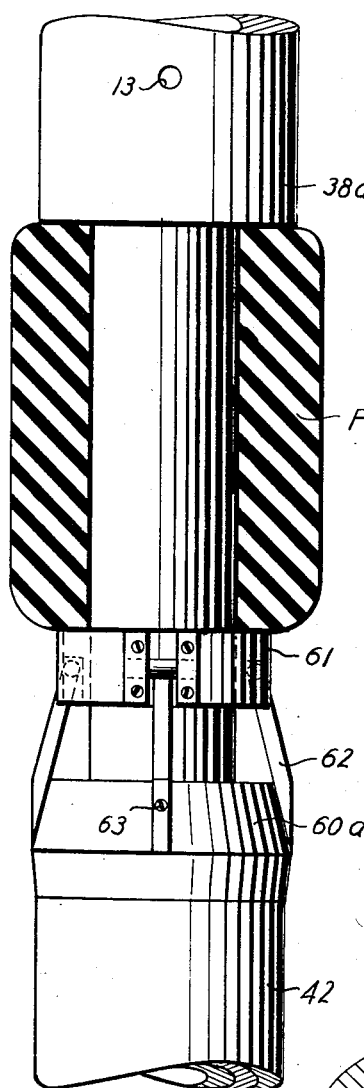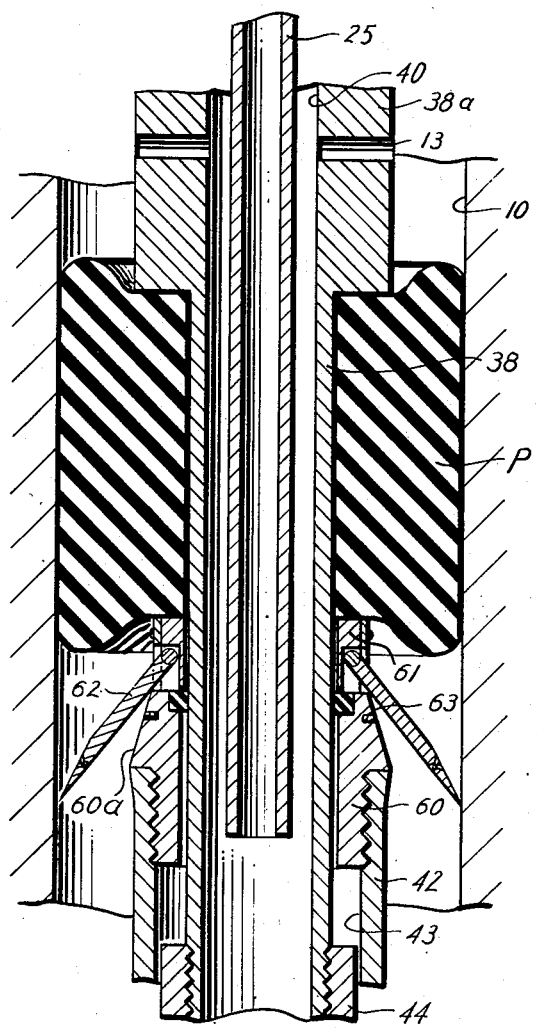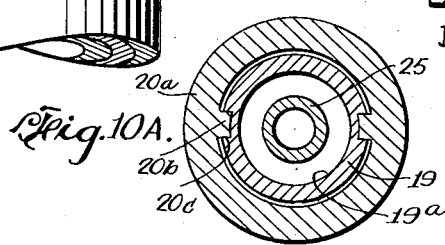

2,711,220

FORMATION TESTING APPARATUS

Drury M. Simmons, Shreveport, La.

Application June 6, 1949, Serial No. 97,404

11 Claims. (Cl. 166—187)

This invention relates to new and useful improvements in formation testing apparatus.

One object of the invention is to provide an improved formation testing apparatus for obtaining a sample of well fluid from a sub-surface formation at any desired point along an open well bore hole.

An important object of the invention is to provide an improved formation testing apparatus capable of testing the production from sub-surface formations within a bore hole regardless of the location of such formation with respect to the bottom of the hole and without the necessity of setting casing in the well bore before conducting the test.

Still another object is to provide an improved testing apparatus of the character described which is so constructed that a test may be conducted with respect to a formation through which the bore hole has been drilled regardless of the position of such formation with respect to the bottom of the hole and without the necessity of employing an anchor tube or pipe for properly positioning the testing apparatus, whereby said apparatus may be selectively positioned at any desired point.

Another object is to provide a formation tester wherein the packing elements thereof which seal off the formation to be tested are initially locked against actuation while the apparatus is run into the well bore to the proper desired position therein, together with means for utilizing the hydrostatic head pressure within the well bore to initially set the packing elements when the desired position is reached, after which the weight of the well pipe may be utilized to accomplish final setting of said packing elements.

Still another object is to provide a formation testing apparatus wherein the means for setting the packing elements of the apparatus is normally locked against actuation by means of a trapped liquid, which liquid is adapted to be released at the desired time to allow the hydrostatic head pressure present within the well bore to actuate the packer setting means.

A further object is to provide an apparatus of the character described which may be set at any point within the open well bore and which may be maintained in said position by the well bore pressure acting against its lower end with the weight of the well pipe acting against its upper end; said apparatus including means actuated by a manipulation of the well pipe for equalizing pressure across the apparatus whereby a removal of the apparatus from the well bore is facilitated after the testing operation has been completed.

Still another object is to provide an improved apparatus for setting a formation testing device at any desired point or elevation within a well bore which may be combined with a testing device of usual construction without the necessity of making any material change in said device.

Other and further objects of this invention will appear from the following description.

In the accompanying drawings which form a part of the instant specification and which are to be read in conjunction therewith and wherein like reference numerals are used to indicate like parts in the various views:

Figure 1 is an elevation of a formation testing apparatus constructed in accordance with the invention and illustrating the same lowered into position within a well bore just prior to the setting operation, Figure 2 is a similar view illustrating the initial setting of the packer elements of the apparatus by the pressure within the well bore, Figure 3 is a similar view with the packer elements in their fully set position, Figure 4 is a similar view showing the parts in the position equalizing pressures across the packing elements whereby the apparatus may be removed from the well bore, Figure 5 is an enlarged transverse vertical sectional view of the upper portion of the apparatus, Figure 6 is a continuation of Figure 5, Figure 7 is a continuation of Figure 6, Figure 8 is a continuation of Figure 7, Figure 9 is a continuation of Figure 8 illustrating the lower portion of the device, Figure 10 is a horizontal cross-sectional view taken on the line 10—10 of Figure 5, Figure 10a is a horizontal cross-sectional view taken on the line 10a—10a of Figure 5, Figure 11 is a horizontal cross-sectional view taken on the line 11—11 of Figure 6, Figure 12 is a horizontal cross-sectional view taken on the line 12—12 of Figure 6, Figure 13 is a horizontal cross-sectional view taken on the line 13—13 of Figure 6, Figure 13a is a sectional detail illustrating the J-slot of the connection between the upper housing and the intermediate housing, Figure 14 is a horizontal cross-sectional view taken on the line 14—14 of Figure 8, Figure 15 is a horizontal cross-sectional view taken on the line 15—15 of Figure 9, Figure 16 is a transverse vertical sectional view illustrating the position of the parts after the packers have been initially set by the well pressure, Figure 17 is a transverse vertical sectional view illustrating the packer elements in their fully set position, Figure 18 is a transverse vertical sectional view illustrating the equalizing valve open during removal of the apparatus, Figure 19 is a transverse vertical sectional view of the lower portion of the apparatus illustrating the position of the lower valve assembly during removal of the apparatus, Figure 20 is a sectional detail of a slightly modified form of the invention with the lower packing element in a normal unexpanded position, and Figure 21 is a view similar to Figure 20 showing the packing element in expanded sealing position.

In the drawings, the numeral 10 designates a well bore or bore hole which has been drilled downwardly through the sub-surface formation and which traverses a particular formation 11 which may be located at any point along said bore. The formation 11 will be presumed to be the formation which it is desired to test. The improved testing apparatus T, which will be hereinafter described in detail, is arranged to be connected to the lower end of the well pipe 12 and by means of said pipe may be lowered to the desired or proper position within the well bore 10. The testing apparatus includes a pair of spaced packers P and P' which are arranged to be expanded into sealing position with the wall of the well bore 10 above and below the formation 11 from which the test is to be made. A fluid inlet port 13 is disposed between the packers P and P' and when the testing apparatus has been properly located and set within the well bore, well fluids from the formation 11 may enter the inlet port 13 and flow upwardly through the apparatus T and then upwardly through the well pipe 12 to the surface. It will be evident that the packers P and P' will pack off above and below the formation under test and thus all well fluids from said formation will be caused to enter the inlet port 13.

The apparatus T is adapted to be selectively positioned at any desired point in the open well bore 10 so that any formation traversed by the well bore may be tested. After the test is complete the apparatus T may be manipulated by means of the well pipe 12 whereby the packers P and P' are released or returned to a normal position to thereby permit removal of the apparatus from the well bore by means of the pipe.

The structural details of the apparatus T are shown in Figures 5-9 and said apparatus includes an upper tubular housing A, an intermediate housing B and a packer assembly C, the latter carrying the packing elements P and P'. The upper housing A includes a tubular casing 14 having an axial bore 15 and within the upper portion of said bore an annular valve seat 16 is formed. Above the valve seat 16 the bore is slightly reduced as illustrated at 15a, and a packing ring such as an O-ring 17 is mounted within an annular groove within this portion. A valve member 18 is adapted to engage the seat 16 to close upward flow through the bore 15 of the housing and the valve member is formed with an upwardly extending tubular shank 19 which has connection through a swaged collar 20 with the lower end of the well pipe 12. The shank 19 extends through a sleeve 20a which is threaded into the upper end of the housing A and is slidably keyed therein by co-acting keys 20b and keyways 20c. An adjusting collar 20d is threaded on the upper end of the sleeve 20a and a coiled spring S which surrounds the shank 19 is confined between the collar 20d and the coupling 20 at the upper end of the shank. The spring S constantly exerts its pressure to urge the shank 19 and valve 18 upwardly with respect to the upper housing A, whereby the valve is normally held in engagement with its seat 16. The engagement of the annular valve seat 16 with the valve 18 suspends or hangs the upper housing A from the valve 18 and the tension of the spring S maintains the parts in this position. By reason of the keys 20b and keyways 20c, the shank 19 is slidable with respect to the upper housing A but may upon rotation impart rotation thereto.

With the valve 18 engaging the valve seat 16, lateral ports 21 which are located above the valve 18 are in effect closed to prevent flow from the bore 15 of the housing A into the bore 19a of the tubular shank. When the tubular shank 19 and valve move downwardly with respect to the housing A the valve is unseated and the ports 21 are moved below the valve seat 16 and at the same time, the surface of the shank 19 is engaged with the packing ring 17. When the parts assume this position, as illustrated in Figure 17, an upward flow through the bore 15 of the upper housing A then through ports 21 and into the bore of the shank 19 may occur. As explained, the shank is directly connected to the well pipe and communicates therewith so that upward flow through the valve 18 may then be upwardly through said well pipe.

The lower end of the housing A is connected through a tubular coupling 22 with a coupling collar 23 and an elongate tubular sleeve 24 has its upper end threaded into the collar. An inner tubular mandrel or flow tube 25 extends axially throughout the entire length of the testing apparatus and has its upper end terminating within the upper portion of the shank 19, as shown in Figure 5. The mandrel extends through the tubular shank 19 and through the valve 18 and has its exterior surface packed off with respect to the tubular valve by means of a sealing ring 26 mounted within a collar 27 threaded onto the lower end of the valve 18. The mandrel then extends downwardly through the housing A, through the coupling member 22 and coupling collar 23, as well as downwardly through the sleeve 24. The mandrel is connected with the coupling sleeve 22 by a coupling member 28, which member is provided with vertical by-pass ports 29 therein. The coupling member 28 actually connects the inner mandrel to the upper housing A so that the housing A and mandrel 25 move as a unit.

The sleeve 24 which is attached to the lower end of the upper housing A extends downwardly within the bore 30 of the intermediate housing B and is coupled thereto by means of the usual pin 31 and J-slot 32 connection, with the J-slot being located within the bore of an inner sleeve 32a which is secured within said housing (Figure 13a). When the sleeve 24 is in a coupled position in the lower end of the J-slot 32 of the inner sleeve 32a within the bore 30 of the intermediate housing, radial equalizing ports 33 formed in the sleeve 24, the purpose of which ports will be hereinafter explained, are located below an annular gland or collar 34 threaded into the upper end of the housing B above the sleeve 32a; a packing ring 35 which may be an O-ring is mounted within an annular recess in the exterior surface of the sleeve 24 and engages the bore of the gland to pack off around sleeve 24 to thereby prevent an upward flow between the bore 30 of the housing B and said sleeve. When the upper housing A and the sleeve 24 are rotated with respect to the intermediate housing B and the inner sleeve 32a, the pin 31 on the sleeve 24 is moved into alignment with the elongate portion of the J-slot whereby an upward movement of the sleeve 24 with respect to the intermediate housing may occur. Such upward sliding movement will permit the equalizing ports 33 to move upwardly out of the intermediate housing, as illustrated in Figure 18 and in this position a flow through the ports 33 to establish communication between the area above the housing and the bore of said housing may occur.

The lower portion of the intermediate housing B is connected to the upper end of the packing assembly C which assembly includes a tubular coupling 36 having its upper end connected to the housing B with its lower end connected to a flanged retainer 37 engaging the upper end of the upper packing element P. A tubular packer supporting mandrel 38 has its upper end extending into the coupling 36 and upward movement of the mandrel 38 with respect to the coupling is limited by an internal shoulder 36a formed in the upper portion of said coupling 36. The upper end of the mandrel 38 carries a collar 38b which is adapted to engage the upper end of the retainer 37 to limit downward movement of the mandrel with respect to the coupling 36. The mandrel carries the packing elements P and P' which surround said mandrel in spaced relationship and the portion 38a between the upper and lower packing elements is provided with the lateral inlet ports 13 whereby when the packers are in a set position fluid from the formation between said packers may enter the ports 13. Upon entering the ports 13 this fluid will flow upwardly through the bore 40 of the tubular supporting mandrel 38 and then upwardly into the bore 30 of the intermediate housing B; from this point flow will be upwardly through the tubular sleeve 24 through the coupling 22 and 23 and into the lower portion of the bore 15 of the upper housing. If the valve 18 is in a seated position flow is stopped at this point but when the valve 18 is open flow may continue through the lateral ports 21 in the valve 18 and thence upwardly through the valve shank into the well pipe 12.

The lowermost packer P' surrounds the supporting mandrel 38 and is retained thereon by an annular retainer 41 and this retainer is carried by an elongate tubular foot member 42 which has a closed interior providing a closed chamber 43. The lower end of the packer supporting mandrel has a coupling nipple 44 secured thereto and an annular packing sleeve 45 is mounted within the bore of this nipple and is retained therein by a tubular plug element or sleeve 46. As explained, the inner elongate mandrel or flow tube 25 which has its upper portion connected to the upper housing extends downwardly throughout the entire apparatus and this mandrel extends downwardly through the intermediate housing B and entirely through the packing assembly C. The lower portion of the mandrel 25 extends through the annular packing sleeve 45 within the lower portion of the packer supporting mandrel 38 and this packing element normally seals off around the inner mandrel 25.

During running of the apparatus into the well and with the parts as illustrated in Figures 5–9, the lower portion of the inner mandrel 25 extends downwardly into the closed chamber 43 which is formed by the tubular foot element 42. Within this lower portion of the inner mandrel 25 an internal valve seat 47 is formed and below the valve seat, ports 48 are provided. A valve 49 for closing upward flow through the bore of the inner mandrel is mounted below the valve seat and is normally urged upwardly by a coil spring 50. The coil spring is confined between the valve head and a closure plug 51 threaded into the lower end of the mandrel. The valve is normally restrained against movement to a seating position by a shear pin 52 which connects the valve stem 49a with a restraining collar 53 disposed below the plug 51. When the pin is sheared, as will be explained, the spring 50 will move the valve head 49 to a seated position.

In the operation of the apparatus the parts are assembled as shown in Figures 5–9 and the apparatus is connected to the lower end of the well pipe 12. At this time the lower valve which controls upward flow through the inner mandrel 25 is locked in its lowered or open position by means of the shear pin 52. The upper or main control valve 18 is in a closed position with the upper housing suspended therefrom and is held so by the coiled spring S. The equalizing ports 33 are closed since the J-slot connection is as shown in Figure 1 with the sleeve 24 coupled in its fully telescoped position within the intermediate housing B. The tubular foot piece or chamber element 42 is in its lowered position with respect to the packer mandrel 38 and is held so by the introduction of a liquid which is introduced into the well pipe and through the inner mandrel or tube 25 into said chamber. The liquid entirely fills the chamber 43 as well as the mandrel 25 and also extends upwardly into the lower portion of the well pipe. This liquid is trapped within the mandrel and the chamber by means of a frangible disc 54 which is mounted on an internal shoulder 55 within the well pipe 12 and is retained in position by a retainer ring 56 (Figure 5). The liquid which is trapped below the frangible disc functions to provide a liquid lock against any possible upward movement of the foot element 42 with respect to the packer supporting mandrel 38 and therefore as the device is lowered into the well there is no possibility of the packers P and P' being moved to a set position by the pressure which may be present within the well bore 10 and which may act against the exterior surface of the tubular foot element 42.

After the liquid has been introduced and the frangible disc 54 properly placed the apparatus is lowered within the well bore 10 to the desired position therein so as to locate the packers P and P' above and below the formation to be tested. It is noted that the portion 38a of the packer supporting mandrel 38 may be of any desired length in accordance with the area of the formation to be tested and the particular length of said portion may vary to permit testing of formations of this area. When the apparatus T has been properly located within the well bore 10, the disc 54 may be fractured by dropping a weight or by other means such as pump pressure and this will permit the pressure which is present within the well bore acting against the tubular foot element 42 to move said element upwardly with respect to the lower packer P'. The trapped liquid within chamber 43 escapes through the ports 48 and upwardly through the bore of the inner mandrel or tube 25. The pressure applied to the lower packer P' is transmitted through the mandrel 38 to the upper packer which is abutting the lower end of the intermediate housing. An upward movement of the intermediate housing is prevented because the said housing is coupled through the J-slot connection, upper housing A, and spring S with the well pipe. It is noted that the strength of the spring S is strong enough to resist compression of said spring by the well bore pressure acting against the foot element. Thus, the pressure present within the well bore telescopes the tubular foot element 42 and the packer mandrel 38 relative to the stationary intermediate housing and applies a pressure to the packing elements P and P' to move the same outwardly into frictional engagement with the well bore 10. It might be that this pressure will initially set only the lower packer P' or it may partially set both packers but in either event, the packer or packers are expanded into initial contact with the wall of the well bore. Obviously the pressure acting against the foot element 42 will also function to maintain the packer or packers in frictional engagement with the well bore and will not only effect an initial seal by said packing elements with said bore but will also hold the entire apparatus against downward movement within the well bore.

At the time that the packers P and P' are initially set any fluid between the packers will enter the lateral ports 13 and will tend to pass upwardly between the inner mandrel 25 and the tubular packer mandrel 38, then upwardly through the intermediate housing B and into the upper housing A. However, because the valve 18 is held closed at this time by the spring S no upward flow beyond the valve is permitted.

After the packer or packers have been initially set, by the well bore pressure, the well pipe is then moved downwardly and this imparts a downward movement to the upper housing and mandrel by compressing the spring S. The ports 48 of the inner mandrel are obviously disposed below the sealing element or ring 45 to shut off communication between the inner mandrel and the bore of the packer mandrel 38. The downward movement of the well pipe is continued to impose the weight of the pipe through the compressed spring S, housing A, sleeve 24 and intermediate housing B onto the upper ends of the packers P and P'. Since the well fluid pressure is acting against the under side of said packers through the tubular foot element 42, this imposition of weight will expand the packers into final set position. After the packers set continued movement of the drill stem and shank 19 is relative to the upper housing A thereby allowing the main valve 18 to move downwardly off of its seat as illustrated in Figure 17. The lower end of the valve 18 then moves into engagement with the coupling connection 28 and through this connection imparts the weight of the drill stem to the housing A, through the J-slot connection 32 to the intermediate housing B whereby the packers are maintained in their fully set position by the weight of the pipe.

The fully set position of the packers is illustrated in Figure 17 and in such position the formation under test is completely sealed off. Well fluid from such formation may enter the ports 13 and flow upwardly around the inner mandrel 25 into the upper housing. The main valve 18, as explained, has been opened upon the downward movement of the well pipe and flow may then be through the lateral ports 21 and upwardly through the tubular shank 19 into the well pipe. From the well pipe the flow of the fluids is to the surface. The parts remain in the set position until such time as the test has been completed.

Removal of the apparatus from the well bore is readily effected by merely lifting upwardly on the well pipe 12 to bring the main valve 18 into engagement with the valve seat 16 so that the upper housing A is again suspended from the well pipe. At this point the well pipe is turned approximately one quarter turn to move the pin into the elongate portion of the J-slot and upon further upward movement of the well pipe the inner mandrel 25 is pulled upwardly with the upper housing and relative to the packer mandrel 38, the latter being held stationary because of the engagement of the packers with the formation. Upward movement of the inner mandrel or tube 25 with respect to the packer mandrel will result in the retaining collar 53 in the lower end of the inner mandrel striking the lower end of the collar 46 secured to the lower end of the packing mandrel 38. When the collar 53 strikes the lower end of the collar 46 the pin 52 is sheared and shearing of the pin allows the spring 50 to immediately move the valve 49 into seated position with the valve seat 47 (Figure 19) whereby an upward flow through the ports 48 and through the bore of the inner mandrel or tube 25 is prevented.

As the upward movement of the housing and mandrel occurs by reason of the pin 31 moving upwardly relative to the J-slot 32 the lower end of the inner mandrel moves to the position shown in Figure 19 in which position the lower end of said mandrel is above the packing element 45 and this establishes a communication between the bore of the packer mandrel 38 and the chamber 43 within the tubular foot element 42. By the time that the pin 31 has traversed the elongate portion of the J-slot the equalizing ports 33 in the sleeve 24 have moved out of the intermediate housing B, as shown in Figure 18. This establishes a communication between the area above the packers and between the packers and also establishes communication between the bore of the packer mandrel 38 and the chamber 43 whereby the pressures in these various areas may be fully equalized. By equalizing the pressures within the chamber 43 with the pressure above and between the packers it is obvious that said pressure will allow the foot element 42 to move downwardly and relieve all pressure acting against the lower end of the mandrel.

When equalization in the various areas occurs continued upward movement of the well pipe will remove or withdraw the apparatus from the well. It is noted that the valve 49 within the lower end of the inner flow tube or mandrel 25 functions as a check valve which will prevent the escape of any of the pressure or fluid which may be flowing through the equalizing ports 33 into the mandrel and then upwardly into the drill pipe so that the apparatus is closed against admission of any of the fluid within the well bore during its removal. It might also be pointed out that the valve 49 would permit a downward circulation of washing fluid through the apparatus if such washing operation were desirable during the removal of the tool.

In order to re-run the apparatus it is only necessary to reset the lower valve by inserting a new shear pin 52 in the valve stem 49a of the inner mandrel valve 49.

From the foregoing, it will be seen that a test apparatus is provided which may be readily positioned at any point within the well bore. The device is constructed so that the lower packer or both packers are initially set by means of the hydrostatic head or pressure present within the well bore. Following the initial set of the packer or packers the weight of the drill pipe is utilized to complete setting of the packer and to also open the main valve which permits the flow of the fluid from the formation under test into the well pipe. Upward movement and manipulation of the well pipe provides for an equalization of pressures across the packer elements so that subsequent removal of the apparatus may be readily accomplished.

In some instances, it may be found that the well bore pressure acting beneath the apparatus is not sufficient to maintain the packers in initial frictional engagement with the well bore with sufficient force to resist the imposition of the weight of the drill pipe which carries out the final setting of the packer elements. If such condition should occur the modification shown in Figures 20 and 21 may be employed. In this construction the upper end of the tubular foot element 42 has a flanged collar 60 connected thereto, this collar being substituted for the retainer 41 (Figure 8) of the first form. Above the collar 60 is a slidable ring 61 which engages the under side of the lower packer P' and this ring carries a plurality of pivoted dogs 62. Normally the dogs overlie the inclined outer surface 60a of the flanged collar 60 and are connected thereto by shear pins 63 as illustrated in Figure 20. The remainder of the apparatus is exactly as heretofore described.

In the operation of this form of the invention the apparatus is run into the well to the desired position with the pivoted dogs 62 held in their inner position by their respective shear pins 63. The tubular foot element 42 is locked against upward movement on the packer mandrel 38 by the liquid which is trapped by the frangible disc. When it is desired to set the apparatus, the frangible disc 54 is broken to permit an escape of liquid from the chamber 43 formed within the element 42 and the pressure within the well will move the element 42 and its collar upwardly. The expanding dogs 62 will remain stationary because of the inherent resistance of the packing elements and this will permit a shearing of the pin 63. Continued upward movement of the element 42 after the pins have sheared will result in an outward movement of the dogs 62 because of the coaction of the surface 60a with the inner surfaces of the dogs 62, and thus the pointed ends of said dogs will be engaged with the walls of the well bore. It will be evident that a subsequent downward pressure on the packing elements P and P' by the imposition of the weight of the drill pipe 12 will cause the dogs 62 to engage further into the formation and provide a positive stop which prevents any lowering movement of the packer elements. The use of the dogs 62 thereby assures that in those wells having insufficient pressure to maintain the packing elements immovably against the weight of the pipe the apparatus may be accurately and properly set. Removal of this form of the apparatus is accomplished in the same manner as heretofore described since an upward lifting movement will disengage the dogs 62 from the formation.

In both forms of the invention any actuation of the packer elements is initially prevented by the confinement of a liquid within the chamber 43 and therefore setting of the packers during lowering of the apparatus is impossible. When the confined liquid is released the well bore pressure is utilized to initially set the packers, after which final setting of said packers and opening of the main control valve for the fluid under test is accomplished by a lowering of the well pipe. Equalization of pressures across the packing elements which permits easy removal of the apparatus is effected by a proper manipulation of the well pipe. During the removal the main control valve is automatically closed.

With respect to the first form of the invention, it is noted that the apparatus is generally similar to the usual type of formation testing tool with the exception of the lower portion thereof which makes possible initial movement of the lower packer or both packers into initial setting position by means of the well bore pressure. Thus, this initial setting means actuated by well bore pressure may be readily combined with ordinary or well known testers by merely modifying such testers and utilizing their basic elements such as the spaced packers with the inlet therebetween and the main sleeve-type valve for controlling flow of the fluid from the formation under test.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described the invention, I claim:

1. A formation testing apparatus for testing a desired formation in a bore hole including, a tubular support adapted to be connected with a well pipe and lowered therewith into the bore hole, the upper end of the bore of the support having communication with the bore of the well pipe, a packer assembly mounted on the support and comprising a tubular mandrel having its bore adapted to communicate with the support, an upper packer and a lower packer mounted on said mandrel, means connecting the upper packer with the support, said mandrel having a fluid inlet disposed between the packers which establishes communication between the area exteriorly of the apparatus and the bore of the mandrel, said packers being expansible into sealing contact with the formation being tested, a movable element slidably mounted on the lower portion of the packer assembly mandrel below the lower packer and having its upper end engaging said lower packer, said element closing the lower end of the mandrel, upward movement of the element relative to the support and packers applying a compressive force to the packers to initially expand said packers, means for locking the movable element in a downward position with respect to the mandrel to prevent movement thereof during lowering of the apparatus, means for releasing said locking means so that well pressure therebelow may move the element upwardly relative to the packer means, and means setting up a connection between the tubular support and the upper end of the packer assembly to permit the weight of the well pipe connected with the support to be imposed upon the packer assembly after the movable element has initially set the packers.

2. A formation testing apparatus as set forth in claim 1, together with a control valve within the bore of the packer assembly mandrel between the fluid inlet of the mandrel and the bore of the well pipe, and means for connecting the valve to the well pipe whereby the valve may be actuated by manipulation of said well pipe.

3. A formation testing apparatus as set forth in claim 1, together with an equalizing valve means forming part of the connection between the support and the packer assembly for selectively equalizing pressures across the packers, and means for controlling operation of the equalizing valve means by manipulation of the well pipe.

4. A formation testing apparatus including, an upper tubular housing adapted to be connected with a well pipe and lowered therewith within a well bore, an intermediate tubular housing attached to the lower portion of the upper housing by a telescoping connection with said connection being normally in fully telescoped position, a packing assembly connected to the lower end of the intermediate housing and having a mandrel capable of limited sliding movement relative to the intermediate housing and having a pair of spaced annular packing elements mounted on the mandrel adapted to be expanded outwardly into sealing engagement with the well bore for sealing off the formation to be tested from the remainder of the well bore, a closed actuating member slidably mounted on the lower portion of the mandrel of the packing assembly below the packing elements and movable upwardly by the fluid pressure present within the well bore for applying a force against the packing elements to initially expand the same outwardly into contact with the wall of the well bore, means setting up a connection between the well pipe and the upper end of the packing assembly whereby the weight of the well pipe may be applied to the packing elements through the upper and intermediate housing with the slidable movement of the intermediate housing with respect to the packer assembly mandrel permitting the weight of the pipe to be transferred directly to said elements, said mandrel having a fluid inlet between the spaced packing elements for admitting fluid from the formation being tested into the bore of the mandrel, and means establishing communication between the bore of the mandrel and the bore of the well pipe.

5. A formation testing apparatus as set forth in claim 4, together with a liquid normally within the closed member and within the lower portion of the mandrel, and means for confining said liquid therein to prevent movement of the member until said liquid is released.

6. A formation testing apparatus as set forth in claim 4, together with an inner tubular conductor extending entirely through the upper and intermediate housings and through the mandrel of the packing assembly and having its upper end attached to the upper housing and communicating with the well pipe, with its lower end communicating with the interior of the closed actuating member, a liquid contained within the actuating member and within the conductor and lower portion of the well pipe, and a frangible closure means within the well pipe for trapping said liquid in the actuating member and conductor whereby movement of the member is prevented by external well bore pressure until the frangible closure means is removed, said closure means being selectively removed when the apparatus is properly located in the well bore.

7. A formation testing apparatus as set forth in claim 4, together with an inner tubular conductor extending entirely through the upper and intermediate housings and through the mandrel of the packing assembly and having its upper end attached to the upper housing and communicating with the well pipe, with its lower end communicating with the interor of the closed actuating member, a liquid contained within the actuating member and within the conductor and lower portion of the well pipe, a frangible closure means within the well pipe for trapping said liquid in the actuating member and conductor whereby movement of the member is prevented by external well bore pressure until the frangible closure means is removed, said closure means being selectively removed when the apparatus is properly located in the well bore, and valve means in the lower portion of the conductor for closing upward flow through and downward flow around the exterior of said conductor after the liquid-confining closure means is removed.

8. An apparatus as set forth in claim 4, wherein the packing assembly is provided with well fluid inlet between the spaced packing elements whereby well fluid from the formation under test may enter the assembly, means for establishing communication through the intermediate and upper housings between the inlet and the well pipe, a control valve incorporated within the connection between the well pipe and upper housing for controlling the flow through said communicating means, said valve being operated by manipulation of the well pipe, and an equalizing valve forming part of the telescoping connection between the upper and intermediate housings for equalizing pressures across the packing elements to permit removal of the apparatus, said equalizing valve being closed when the connection is in telescoped position and being open when the connection is extended.

9. A formation testing apparatus as set forth in claim 4, together with outwardly movable dogs mounted on the lower portion of the packing assembly and adapted to be moved outwardly into engagement with the wall of the well bore by the closed actuating member, whereby said dogs lock the apparatus against downward movement in the well bore to assure that the weight of the well pipe may be imposed upon the packing elements.

10. A formation testing apparatus for testing a desired formation in a bore hole including, a tubular support adapted to be connected with a well pipe and lowered therewith into the bore hole, the bore of said support communicating with the bore of said well pipe, annular packer means mounted on the support in spaced relationship and expansible into contact with the formation to seal off the remainder of the bore hole from the formation being tested, said support having a fluid inlet between the packer means, a control valve in the support controlling the communication between the bore of the support and the bore of the pipe, a movable element slidably mounted on the lower portion of the support below the packer means and adapted to be moved upwardly to apply a compressive force to the packer means to initially expand said packer means, a conductor extending axially within the support and having its upper end communicating with the bore of the well pipe and its lower end communicating with the interior of said movable element, said conductor and the interior of the movable element forming a liquid chamber which normally communicates with the bore of the well pipe, a frangible disc in the well pipe above the conductor, a liquid confined between said disc and within the conductor and movable element for locking said element against movement until the disc is fractured, whereby fracturing of said disc permits the bore hole pressure to move the element to apply initial setting pressure to the packer means, and means setting up a connection between the well pipe and the upper end of the packer means whereby the weight of the well pipe may be imposed upon the packer means to complete and maintain setting of said means following the application of the initial setting pressure by the movable element.

11. The combination with a formation testing apparatus having spaced packers mounted on a support with a fluid inlet therebetween and adapted to be lowered on a well pipe into a well bore, of a means for applying pressure to the lower end of the lower packer, said means including, a movable element slidably mounted on the lower end of the support and having its exterior surface exposed to the pressure within a well bore so as to be actuated thereby, means for locking said element against movement with respect to the support to normally prevent actuation thereof, means for selectively releasing the element for operation when the apparatus is properly positioned within a well bore, application of pressure against the lower packer by said element initially setting the packer and also functioning to hold the apparatus against downward movement, and means for connecting the well pipe to the upper end of the uppermost packer, whereby the weight of the well pipe may be imposed upon the packers to complete the setting thereof.

References Cited in the file of this patent

UNITED STATES PATENTS

| Number | Name | Date |
|---|---|---|
| 976,737 | Hemme | Nov. 22, 1910 |
| 1,124,602 | Fuqua et al. | Jan. 12, 1915 |
| 1,956,694 | Parrish | May 1, 1934 |
| 2,326,867 | Kinney | Aug. 17, 1943 |
| 2,458,631 | Parks | Jan. 11, 1949 |
| 2,516,580 | Lynes | July 25, 1950 |
| 2,516,581 | Lynes | July 25, 1950 |